May 25, 1971 — E. F. FERKOVICH — 3,579,689

THREAD CONDITIONING AND RESTORING TOOL

Filed Oct. 4, 1968

INVENTOR,
EDWARD FERKOVICH

BY
Watson, Cole, Grindle & Watson
ATTORNEYS

United States Patent Office 3,579,689
Patented May 25, 1971

3,579,689
THREAD CONDITIONING AND RESTORING TOOL
Edward F. Ferkovich, 1341 S. 5th St.,
Raton, N. Mex. 87740
Filed Oct. 4, 1968, Ser. No. 765,190
Int. Cl. B23g 5/04, 5/06
U.S. Cl. 10—140                              1 Claim

ABSTRACT OF THE DISCLOSURE

A threaded restoring tool comprising die elements having internal cutting teeth for restoring threads, a nut member in threaded engagement with external threads on the die elements which are arranged for a threaded direction of movement by the nut member which is opposite to the threaded direction of movement by the cutting teeth so that rotation of the nut member in its threaded direction of movement serves not only to tighten the die elements about the threads to be restored but causes the cutting teeth to rethread the threads to be restored by moving the cutting teeth in its opposite direction of movement.

---

This invention relates to a thread conditioning and restoring tool and more particularly to a tool designed to be easily applied to and turned on a threaded article.

An object of the invention is to provide a thread restoring tool which may be easily mounted on a threaded article such as a bolt, stud, screw, etc. and backed off such articles with a minimum amount of time and effort.

Another object of the invention is to provide a thread restoring tool in which the rotational force required to back the tool off while reconditioning the threaded article may also serve to maintain the tool securely on the article.

Still another object of the invention is to provide a thread restoring tool which is simply constructed and thus economically manufactured, is durable, efficient in use, and easily manipulated.

These and other objects will become apparent upon further more detailed description of the invention which follows taken in connection with the accompanying drawings, wherein.

Figure 1:
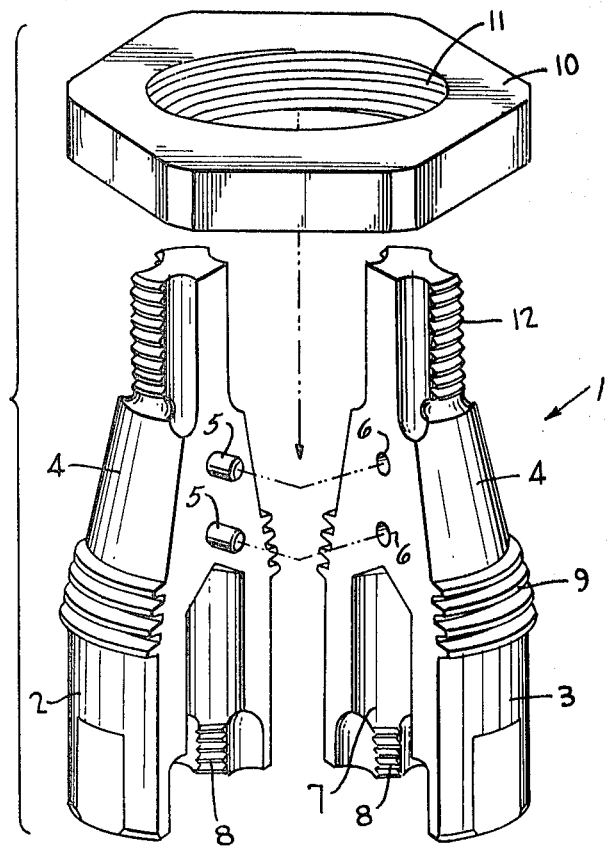
FIG. 1 is an expanded perspective view of the device.
Figure 2:
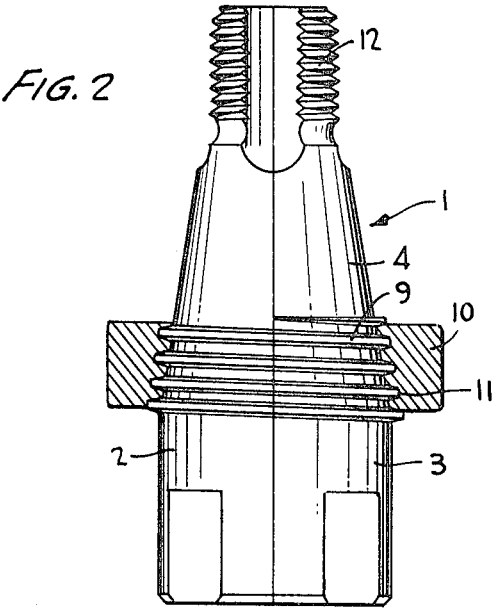
FIG. 2 is a side view of the device in assembled condition.
Figure 3:
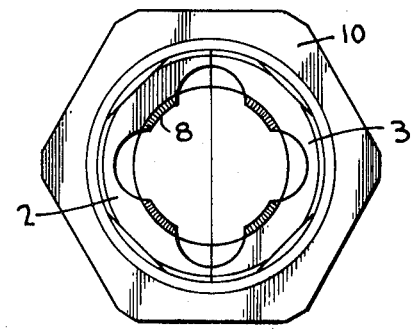
FIG. 3 is an end view of the device in assembled condition.

The thread conditioning or restoring tool, shown generally as 1, comprises two substantially identical sections 2, 3 which together form a generally cylindrical exterior surface, tapered or cone-shaped as at 4, towards one end thereof. The two sections are aligned when assembled by dowel pins 5 secured permanently in one of the sections 2 which fit precisely in holes 6 in the other section 3.

A longitudinally extending cavity 7 is formed internally of the tool at the end thereof having the larger cross section. Thread cutting teeth 8 which may be machine cut are provided at the entrance to the cavity 7. The remainder of the cavity serves to accommodate the end of the threaded object as where the threads extend a substantial distance from the end of the object.

Externally of the tool on the tapered part 4 thereof a tapered threaded section 9 is provided over which is secured a nut 10 which has a corresponding internally tapered thread 11. If the tool and particularly the threaded cutting teeth 8 are designed for restoring right-handed threads, the tapered threads 9, 11 will be designed as left-hadned threads for reasons to be described later.

Optionally, the narrow portion of the tool may include external thread cutting teeth 12 which are conveniently used for restoring the threads of an internally threaded object such as a nut.

The above described tool is easily manipulated during its use. When the damaged threads on, for example, a stud, are to be restored, the two identical sections 2, 3 are assembled together with the thread cutting teeth 8 engaging the innermost threads at the base of the stud, the end of the innermost stud extending into the cavity 7. The nut 10 is then passed over the narrow end of the tool and threaded onto the tapered threads 9 of the tool in the left-handed direction, assuming the damaged threads on the stud and the thread cutting teeth 8 are right-handed. Once the nut becomes tightly threaded onto the tapered thread, rotation of the nut is continued in the same direction causing the whole tool to begin rotation in the left-handed direction, thus causing the thread cutting teeth 8 to restore the threads on the stud as the tool moves away from the base of the stud toward the end thereof. It may be readily observed that the nut retains the two identical sections 2, 3 in proper relative position, and the greater the rotational force applied to the nut during the thread restoring operation the more pressure applied to the identical sections 2, 3 to retain them together. The dowel pins 5 which project into holes 6 maintain proper alignment between the two identical sections 2, 3, thus ensuring that the thread cutting teeth 8 remain in proper alignment.

An advantage of the tool is that it may be placed upon the stud or other threaded object quite easily, and the clamping operation for securing the two identical sections together and performing the restoring operation itself are one and the same. Thus, efficiency is increased. As mentioned above, the thread cutting teeth 12 may be used in the conventional manner for restoring the threads of an internally threaded object. In this instance, the tool is first assembled with the nut 10 secured thereon before the cutting teeth 12 are threaded into the internally threaded object.

A tool produced in accordance with the present invention is designed for a specific size thread. It, therefore, will be readily apparent that where one skilled in the art will be restoring the threads of articles with different sizes of threads or of difference pitches it will be necessary to have different tools having the same general design but with appropriate thread cutting teeth. Conveniently the thread cutting teeth 8 and 12 on any one tool will be designed for restoring the external and internal threads of the same size, though in specific instances a tool of this type may be designed with the thread cutting teeth 8 and 12 of two different sizes.

It is understood that a preferred embodiment of the invention is herein described and that the invention is susceptible to certain changes fully comprehended by the spirit of the invention.

Having described the invention, what is claimed is:

1. A thread restoring tool comprising a plurality of die elements together forming an annular die and having internal thread cutting teeth at one end thereof adapted to be fitted around threads to be restored, and external threads intermediate said one end, and the other end of the tool, a complementary internally threaded nut member in threaded engagement from said other end with said external threads, the exterior of said die being conically shaped intermediate said ends in a direction toward said other end, contacting surfaces of said die elements respectively having dowel pins and mating holes for positively aligning said die elements together, said external threads and the internal threads of said nut member being arranged for a first threaded direction of movement between one another while said internal thread cutting teeth are arranged for a second threaded direction of movement with the complementary threads to be restored, said first and second threaded directions of movement being opposite one another, whereby the threaded engagement between said nut member threads and said external threads serves not only to maintain said die elements assembled about the threads to be restored but, continued rotation of said nut member in said first direction serves to tighten said die elements about the threads to be restored, and a further continued rotation of said nut member causes said internal cutting teeth to rethread the threads to be restored as said annular die rotates in said first threaded direction of movement.

References Cited

UNITED STATES PATENTS

| | | | |
|---|---|---|---|
| 1,803,888 | 5/1931 | Basola et al. | 10—116 |
| 2,391,223 | 12/1945 | Burrows | 10—140 |
| 2,333,462 | 11/1943 | Burt | 10—116 |
| 2,822,555 | 2/1958 | Davis | 10—1 |

RICHARD J. HERBST, Primary Examiner

E. M. COMBS, Assistant Examiner